March 4, 1924.
P. BALLAŽ
FASTENER
Filed April 9, 1923
1,485,359
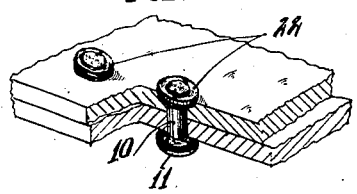
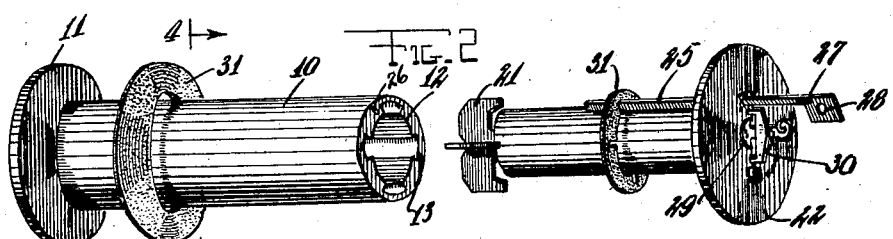
Inventor
Peter Ballaž
By
Attorney Patented Mar. 4, 1924.

1,485,359

UNITED STATES PATENT OFFICE.

PETER BALLAŽ, OF WEST NEW YORK, NEW JERSEY.

FASTENER.

Application filed April 9, 1923. Serial No. 631,048.

*To all whom it may concern:*

Be it known that I, PETER BALLAŽ, a citizen of Czechoslovakia, residing at West New York, in the county of Hudson and State of New Jersey, have invented certain new and useful Improvements in Fasteners, of which the following is a specification.

This invention relates to a means for holding any desired parts together, and it has for an object to provide a novel and improved device of this kind characterized by ease of application and removal.

For further comprehension of the invention, and of the objects and advantages thereof, reference will be had to the following description and accompanying drawings, and to the appended claims in which the various novel features of the invention are more particularly set forth.

Fig. 1 of the drawings is a perspective view showing my improved device in use locking or securing two plates together.

Fig. 2 is a perspective view of the device with the two main elements thereof slightly separated.

Fig. 3 is a fragmentary perspective view of the female element.

Fig. 4 is a transverse sectional view of the device this view being taken at the point indicated by the line 4—4 on Figs. 2 and 3.

Fig. 5 is a fragmentary axial sectional view of the device showing the male element as inserted in the female element but not turned to locking position.

Fig. 6 is a transverse sectional view thereof, taken on the line 6—6 of Fig. 5.

My improved fastening device comprises a cylindrical female element 10, one end of which is closed by an enlarged fixed disk-like head 11. Formed on the inner face of this element, and extending longitudinally inward for a suitable distance from the other end of the same (which latter end is open) are a number of ribs 12 leaving grooves or passages 13 between them. The inner ends of these ribs are formed with longitudinally projected flanges 15 which extend around the inner faces, radially considered, of said ribs and also along one radial edge.

The male element comprises the circular bar or shank 20 which carries the cruciform arranged hooks or prongs 21 on its inner end, which prongs are turned backward toward the shank 20. Upon the opposite end of this element is a head 22 similar to the head 11 on the element 10.

In use the element 20 is inserted in the element 10 and then given a partial turn to engage the hooks 21 behind the inner ends of the ribs 12, while means are provided to prevent reverse rotation or turning of the element 20. This means as here shown comprises a key in the form of a flat bar 25 which is inserted through a suitable opening in the head 22 and through a suitable longitudinal slot 26 in one of the ribs 12 its inner end projecting across the path of rotary movement of the hooks 21 and thereby preventing disengagement of the latter from the ribs. On the outer end of the bar 25 is an enlarged head 27 in which is an opening 28 adapted to receive the free end of a latch 29 pivoted to the head as to retain the bar in locking position, a retaining element 30 being provided for the latch to prevent its movement away from the head. Rubber or leather washers 31 may if desired be interposed between the heads and the objects being held together. When the bar 25 is pushed inward the opening 28 is in position to be engaged by the latch 29 which is then swung forward to engage in the said opening and prevents outward movement of the bar.

To permit of variation of the distance the heads 11 and 22 are spaced from one another when the hooks 21 are engaged behind the ribs 12, these hooks are preferably formed on the end of a screw 35 threaded into an axial socket 36 in the element 20. This screw is held against turning by means of a feather 37 on a collar 38 freely surrounding the unthreaded forward portion of the screw, this feather engaging in a short longitudinal slot or groove 39 in the screw. The collar 38 is held against turning by means of radial projections 40 thereon normally engaging in suitable offsets 41 leading in an axial direction from an interior recess 42 in the element, these projections being held in the said position by means of an expansion spring 43 located in the recess 42 behind the collar 38 and bearing on the rear end of the latter. When the screw 35 is to be turned in the element 21, the collar is pushed inward to disengage the projections 40 from the offsets 41 and the screw then turned.

It is believed that the manner of use of my improved device will be readily understood from the above description. The female element is first inserted in place in the apertures provided in the parts to be joined and the male element is then inserted in place in the other one, the hooks 21 passing through the passages 13, and being turned behind the ribs 12. The key 25 is then inserted in place and the latch 29 fastened, thus preventing displacement of the element 20.

While I have illustrated and described a preferred embodiment of my invention it is to be understood that I do not limit myself to the exact details of construction herein shown, and the right is reserved to all changes and modifications coming within the scope and spirit of the invention as defined in the appended claims.

Having thus described my invention what I claim as new and desire to protect by Letters Patent of the United States is as follows:

1. A device of the class described comprising a cylindrical female element having a series of longitudinal ribs formed on its inner face, and a male element having hook-like projections adapted to engage behind said ribs, flange extensions on the inner ends of said ribs adapted to prevent displacement of said hooks from behind said ribs in one rotative direction, and a key carried by the male element and adapted to prevent disengagement of said hooks from said ribs in an opposite direction.

2. A device of the class described comprising a cylindrical female element having a series of longitudinal ribs formed on its inner face, and a male element having hook-like projections adapted to engage behind said ribs, flange extensions on the inner ends of said ribs adapted to prevent displacement of said hooks from behind said ribs in one rotative direction, and a key carried by the male element and adapted to prevent disengagement of said hooks from said ribs in an opposite direction, said key being in the form of a flat bar passing through a slot in one of said ribs, and a latch on said male element adapted to engage the outer end of said bar to prevent displacement thereof.

3. A device of the class described comprising a cylindrical female element having a series of longitudinal ribs formed on its inner face, and a male element having hook-like projections adapted to engage behind said ribs, and heads on the removed ends of the said elements.

4. A device of the class described comprising a cylindrical female element having a series of longitudinal ribs formed on its inner face, and a male element having hook-like projections adapted to engage behind said ribs, a screw-threaded longitudinally into the said male element and having the said hooks formed thereon, and means for locking said screw against rotation in said male element.

5. A device of the class described comprising a cylindrical female element having a series of longitudinal ribs formed on its inner face, and a male element having hook-like projections adapted to engage behind said ribs, a screw-threaded longitudinally into the said male element and having the said hooks formed thereon, and means for locking said screw against rotation in said male element, said means comprising a collar freely surrounding the said screw and having a feather connection therewith, and interlocking members on said collar and the body of the male element adapted to hold the collar against rotation on said male element.

6. A device of the class described comprising a cylindrical female element having a series of longitudinal ribs formed on its inner face, and a male element having hook-like projections adapted to engage behind said ribs, a screw-threaded longitudinally into the said male element and having the said hooks formed thereon, and means for locking said screw against rotation in said male element, said means comprising a collar freely surrounding the said screw and having a feather connection therewith, and interlocking members on said collar and the body of the male element adapted to hold the collar against rotation on said male element, and resilient means holding the said interlocking members in operative position.

In testimony whereof I have affixed my signature.

PETER BALLAŽ.